United States Patent
Okimoto

(12) 
(10) Patent No.: US 6,389,456 B1
(45) Date of Patent: May 14, 2002

(54) DEVICE FOR FORMING ON RECORDING MEDIUM IMAGE CORRESPONDING TO ELECTRONIC MAIL

(75) Inventor: Satoshi Okimoto, Komaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/232,458
(22) Filed: Jan. 19, 1999

(30) Foreign Application Priority Data

Jan. 19, 1998 (JP) .............................. 10-008114

(51) Int. Cl.[7] .............................................. G06F 13/00
(52) U.S. Cl. ...................................................... 709/206
(58) Field of Search .......................................... 709/206

(56) References Cited

U.S. PATENT DOCUMENTS

| | | | | |
|---|---|---|---|---|
| 6,014,688 A | * | 1/2000 | Venkatraman et al. | 709/206 |
| 6,014,689 A | * | 1/2000 | Budge et al. | 709/206 |
| 6,092,104 A | * | 7/2000 | Kelly | 709/206 |
| 6,247,011 B1 | * | 6/2001 | Jecha et al. | 707/9 |
| 6,256,666 B1 | * | 7/2001 | Singhal | 709/217 |

* cited by examiner

Primary Examiner—Kenneth R. Coulter
(74) Attorney, Agent, or Firm—Oliff & Berridge PLC

(57) ABSTRACT

An image forming device includes image forming means for forming an image on a recording medium, electronic mail receiving means for receiving an electronic mail transmitted from a personal computer, control means for controlling the image forming means according to contents of the received electronic mail whether or not the electronic mail is accompanied by a print file, so that an image corresponding to the electronic mail is formed on the image forming medium.

16 Claims, 4 Drawing Sheets

MAIL CONSTITUENT ELEMENTS

| |
|---|
| ENVELOPE COMPOSED OF DELIVERY INFORMATION |
| HEADER INCLUDING INFORMATION SUCH AS SUBJECT MATTER USED BY ELECTRONIC MAIL PROGRAM |
| BODY INCLUDING MESSAGE AND ACCOMPANYING FILE USED BY ADDRESSEE |

FIG. 4

DEVICE FOR FORMING ON RECORDING MEDIUM IMAGE CORRESPONDING TO ELECTRONIC MAIL

BACKGROUND OF THE INVENTION

1. Field of the Invention

This invention relates to an image forming device for forming on a recording medium an image corresponding to an electronic mail received via a communication line from a computer.

2. Description of the Related Art

Data as an electronic mail is conventionally transmitted and received between personal computers via a communication network system such as internet. More specifically, an electronic mail transmitted from a sender's side is received by a personal computer at an addressee's side. The data is stored as received mail data in a storage device such as a hard-disc. An operator at the addressee's side reads the contents of the electronic mail if necessary. Or, when read via an application software (hereinafter, "application") started on the personal computer, the mail data is delivered to an image forming device connected to the personal computer, for example, a printer, so that an image corresponding to the electronic mail is formed on a recording medium such as recording paper.

In the above-described image forming technique, data in the electronic mail is first read by an application such as a word-processing software. The read data is then delivered to the printer to be formed into the image. These processes require much time. The personal computer having received the electronic mail cannot carry out other processes in this time period. mail cannot out other processes in this while.

In view of the above-described problem, an electronic mail to be transmitted is proposed to be accompanied by a print file for a printer. When receiving an electronic mail accompanied by the print file, the personal computer directly delivers the received mail to the printer so that an image corresponding to the mail can be formed by the printer. Accordingly, the application such as the word-processing software need not be started and the received electronic mail need not be read via the application in the personal computer at the addressee's side. This results in efficient use of the personal computer.

However, an electronic mail received by the personal computer at the address's side is not always accompanied by the print file depending upon the sender thereof. Accordingly, the addressee needs to judge whether the received electronic mail is accompanied by the print file, on the personal computer. The addressee further needs to start the application such as the word-processing software when judging that the mail is not accompanied by the print file. Thus, image formation cannot be performed in the conventional printers according to the electronic mail when it is not accompanied by the print file. Consequently, the personal computer cannot completely be released from the processes of the received electronic mail by directly connecting the printer to the internet etc.

SUMMARY OF THE INVENTION

Therefore, an object of the present invention is to provide an image forming device which can form an image corresponding to a received electronic mail whether or not the electronic mail is accompanied by the print file.

The present invention provides a printing apparatus comprising image forming means for forming an image on a recording medium, electronic mail receiving means for receiving an electronic mail, and control means for controlling the image forming means according to contents of the received electronic mail whether or not the electronic mail is accompanied by a print file, so that an image corresponding to the electronic mail is formed on the recording medium. The control means includes judging means for judging whether the electronic mail received by the electronic mail receiving means is accompanied by a print file, first image formation control means for forming the image corresponding to the electronic mail in a form based on a print file when the judging means judges that the electronic mail is accompanied by the print file, and second image formation control means for forming the image corresponding to the electronic mail in a previously set form when the judging means judges that the electronic mail is not accompanied by a print file.

According to the above-described image forming device, the control means controls the image forming means according to the contents of the received electronic mail whether or not the electronic mail is accompanied by a print file, when the electronic mail receiving means receives the electronic mail. As a result, an image corresponding to the received electronic mail is formed on the recording medium. In other words, the image forming device is capable of forming on the recording medium the image corresponding to the received electronic mail while being directly connected to the communication line of the internet etc. via no personal computer. Consequently, the personal computer can completely be released from the processes of the electronic mail.

In a preferred form, the control means includes judging means for judging whether the electronic mail received by the electronic mail receiving means is accompanied by a print file, first image formation control means for forming the image corresponding to the electronic mail in a form based on a print file when the judging means judges that the electronic mail is accompanied by the print file, and second image formation control means for forming the image corresponding to the electronic mail in a previously set form when the judging means judges that the electronic mail is not accompanied by a print.

Furthermore, the image corresponding to the electronic mail is formed on the recording medium in the form based on the print file when the received electronic mail is accompanied by the print file. On the other hand, when the received electronic mail is accompanied by no print file, the image corresponding to the electronic mail is formed on the recording medium in the previously set form.

In a preferred form, the control means further includes second judging means for judging whether the received electronic mail is accompanied by any accompanying file other than the print file when the judging means judges that the received electronic mail is not accompanied by the print file, third judging means for judging whether the accompanying file is usable for image formation when the second judging means judges that the received electronic mail is accompanied by the accompanying file, and third image formation control means for forming the image corresponding to the electronic mail in a form based on the accompanying file when the third judging circuit judges that the accompanying file is usable for image formation.

In another preferred form, when the accompanying file other than the print file is an image file, the third judging means judges that the accompanying file is usable for image formation. Further, when the second judging means judges that the received electronic mail is accompanied by a plurality of accompanying files other than the print file, the third judging means judges whether each of the plurality of accompanying files is usable for image formation. Various types of image files may be used in the present invention. For example, a tagged image file format (TIFF) or a joint photographic experts group (JPEG) may be used. Upon use of these types of files, the form of image formation can readily be defined by making use of a facsimile mode of the forming device.

BRIEF DESCRIPTION OF THE DRAWINGS

Other objects, features and advantages of the present invention will become clear upon reviewing the following description of the preferred embodiment thereof made with reference to the accompanying drawings, in which:

FIG. 4 illustrates constituent elements of the electronic mail with which the printing system deals.

DETAILED DESCRIPTION OF THE PREFERRED EMBODIMENT

Figure 1:
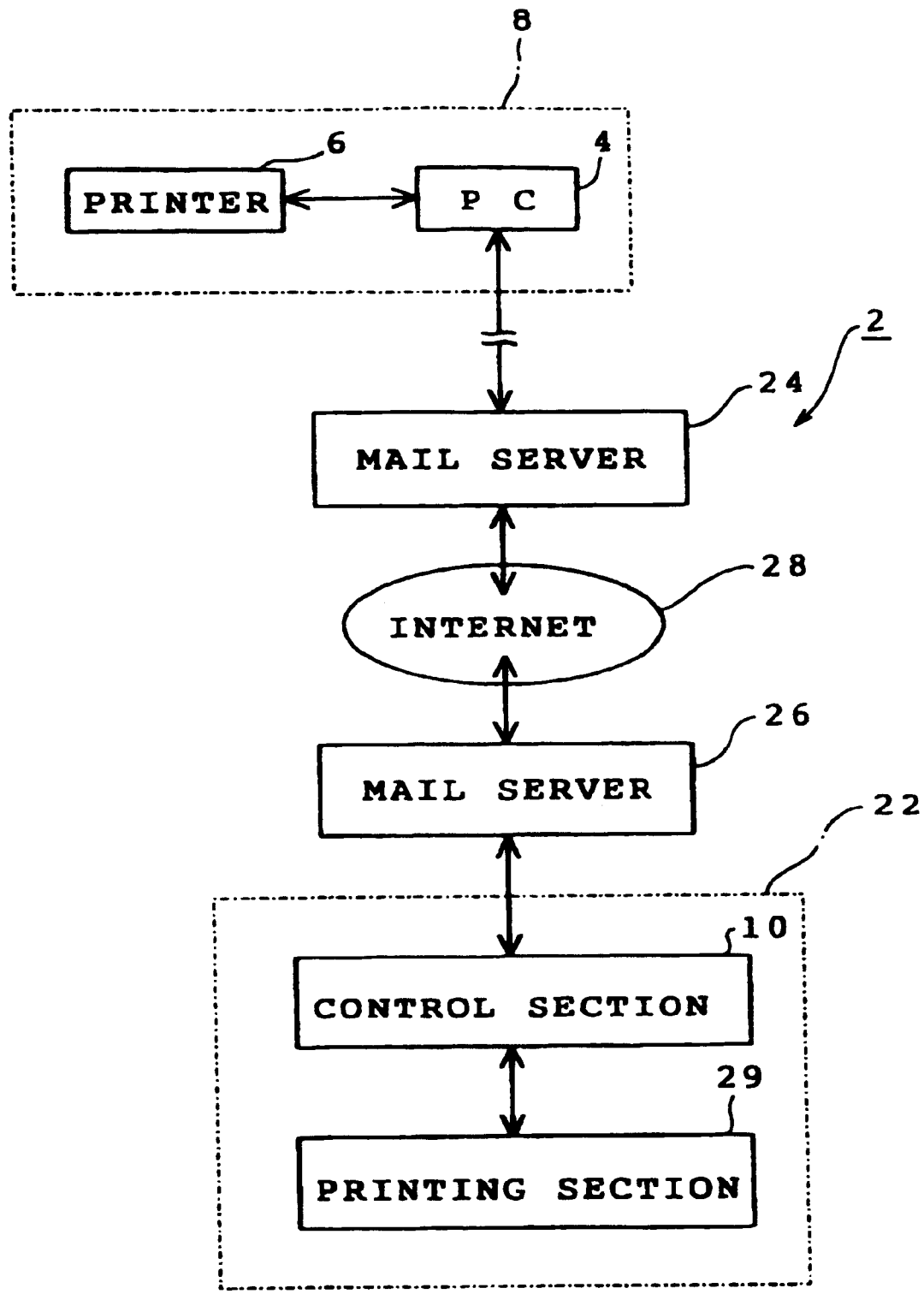
FIG. 1 is a block diagram schematically showing the arrangement of a printing system to which the present invention is applied.

One embodiment of the present invention will be described with reference to the accompanying drawings. Referring to FIG. 1, the arrangement of a printing system 2 to which the invention is applied is schematically shown. The printing system 2 includes a computer system 8 at an electronic mail addresser's side which is mainly constituted by a personal computer 4 and a printer 6. The printing system 2 further includes a printer 22 serving as an image forming device. The computer system 8 and the printer 22 are connected via electronic mail servers 24 and 26 by an internet 28. The printer 22 comprises a printing section 29 serving as image forming means (imaged forming section) for printing or forming an image on printing paper as a recording medium, and a control section 10 serving as control means driving the printing section 29 via a printer driver 30 which will be described later and the like. The control section 10 mainly comprises a microcomputer including a CPU, a ROM, a RAM, etc., as well known in the art.

The mail server 24 is provided by a provider, whereas the mail server 26 is connected to the printer 22 equipped in a company, for example. The computer system 8 transmits electronic mails via the mail server 24 to the internet 28 using a simple mail transfer protocol (SMTP).

First, at the electronic mail addresser's side, an operator transmits a normal electronic mail composed of text data using an application started in the personal computer 4, for example, a mail software. The operator may use an application such as a word processing, tabular or drawing software to make an image to be transmitted. The operator further makes a print file designating a desired format through a printer driver incorporated in the personal computer 4. The print file is described in a predetermined page description language, for example, a de facto standard printer control language system such as PCL, Postscript or GDI, so that the contents of an electronic mail can be confirmed by the printer 6 connected to the personal computer 4. The operator can transmit the print file as an accompanying file by utilizing the mail software.

The operator may transmit a part of the image via a facsimile machine to one addressee and another part of the image via the electronic mail to another addressee. In this case, the operator selects a facsimile driver (not shown) instead of the printer driver to make a facsimile data file (data format such as G3 compressed data or TIFF) which takes the same form as transmitted via the facsimile machine. The operator sends the facsimile data file as a file accompanying an electronic mail to the addressee by utilizing the mail software.

Further, when the personal computer 4 can be supplied with data from an image reader such as an image scanner (not shown), the operator converts supplied image data into a file of a predetermined data format (a standard format such as TIFF or JPEG, for example), sending the file with an electronic mail. An effective image output is obtained from the image data including the above-described facsimile data or image data when the addressee's printer 22 has a capacity to analyze the data.

When the electronic mail is transmitted in a manner as described above, the mail software requires the operator to input the information necessary for transmission of the electronic mail, for example, a used SMTP, an address of the mail server 24, an addressee or a subject matter, thereby making a mail header based on the input information. Further, when various forms of files accompanying the electronic mail, the mail software also adds to the mail header identifiers indicative of attributes of the files as file information. The mail software finally adds an envelope and header to a message comprising text data or to a body comprising various files, composing an electronic mail having a format as shown in FIG. 4 and transmitting the electronic mail to the mail server 24.

Figure 2:
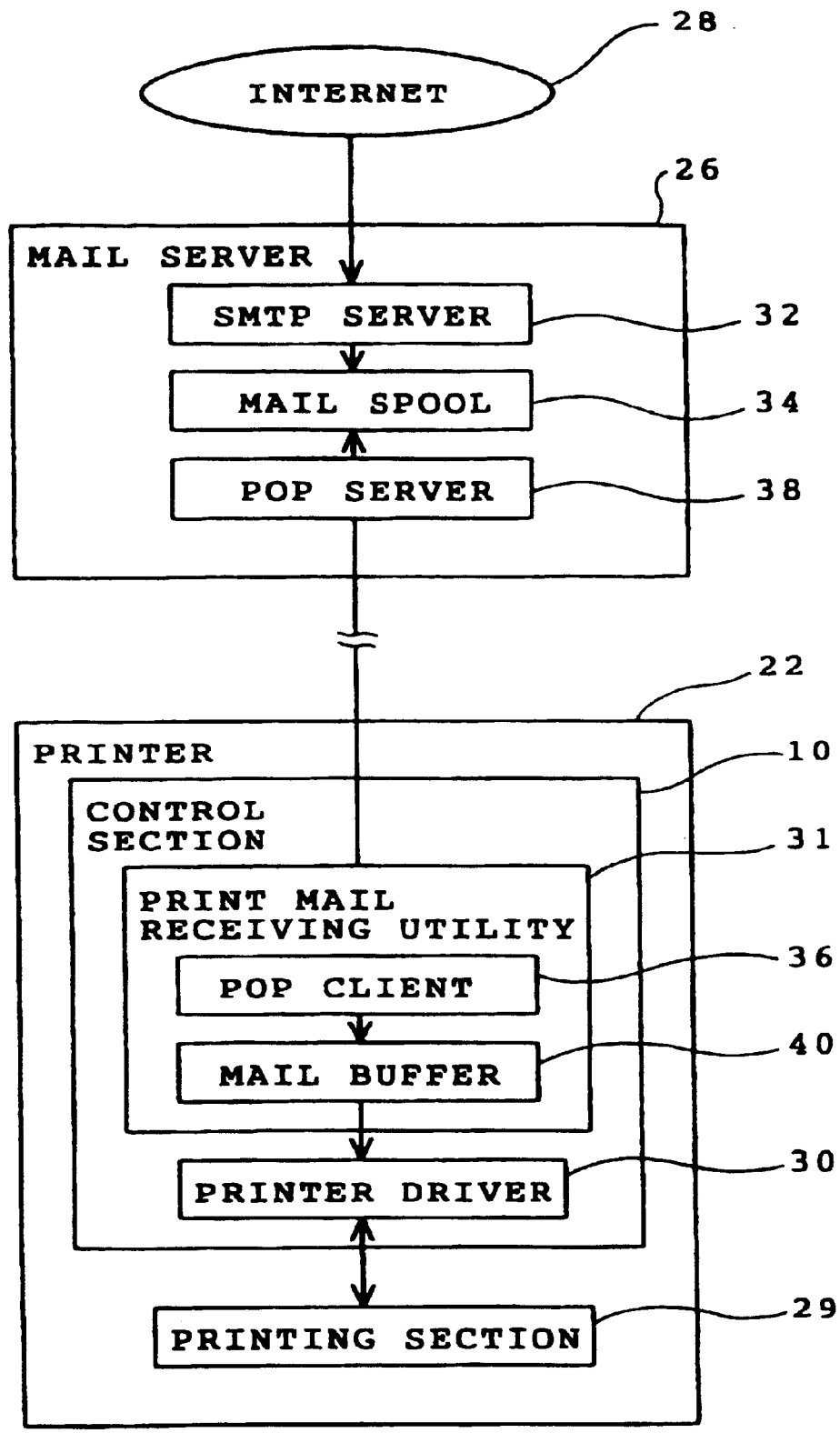
FIG. 2 is a block diagram showing the printing system at an addressee's side.

Referring to FIG. 2, an SMTP server 32 of the mail server 26 receives the SMTP electronic mail containing a normal mail and a print mail from the internet 28 side. The electronic mail directed to the mail server 26 is stored in a mail spool 34, whereas the other electronic mail is re-transmitted to the internet 28 side.

On the other hand, the printer 22 is provided with a print mail receiving utility 31 for receiving the electronic mail from the mail server 26 and giving instructions according to the contents of the received electronic mail to a printer driver 30. The printer 22 is further provided with the printer driver 30 for converting the predetermined page description language, facsimile data, etc. to image data the printing section 29 can process. The printer driver 30 has at least one type of emulation with a function of analyzing the above-mentioned page description languages to convert them to image data. The printer driver 30 may have a plurality of emulations if necessary. Further, the printer driver 30 can be provided with a facsimile emulation analyzing the facsimile data to convert it to image data as well as the page description languages and a function of analyzing a predetermined compressed image format to convert it to image data by the addition of a processing program.

The control section 10 including the print mail receiving utility 31 and the printer driver 30 is further provided with a storage area (for example, ROM) for controlling font necessary in printing the text data and a storage area (for example, RAM) for controlling print forms. A plurality of print forms are provided according to an amount of electronic mail, information about an addresser, etc. The print forms are identifiable so as to be properly used according to the results of analysis of the header. For example, when one addresser frequently transmit an electronic mail, a proper print form can be defined previously. Accordingly, a predetermined print form is set to be selected when it is judged that a received electronic mail is from the addresser. Further, when an amount of electronic mail is large, another print form which can decrease the number of pages by scaling down the image. This attribute of the electronic mail can be confirmed from the contents of the mail header of the electronic mail the print mail receiving utility 31 has received.

The print mail receiving utility 31 further analyzes the mail header of the received electronic mail to thereby judge whether the received mail contains an accompanying file. When the received mail contains an accompanying file, the print mail receiving utility 31 further judges what the attribute of the accompanying file is. The print mail receiving utility 31 gives instructions to the printer driver 30 based on the results of judgment. For example, when judging that text data of message of a normal electronic mail has been received, the print mail receiving utility 31 instructs the printer driver 30 that the normal electronic mail has been received. According to the instruction, the printer driver 30 converts the text data to image data of a predetermined format based on the font, print form, etc. the data of which is stored in the control section 10, delivering the image data to the printing section 29.

When the print file is described in a specific page description language, the printer driver 30 starts up an emulation for converting the specific language so that the image data is originated. The print file is converted in the same manner as described above when it is an image file. The print file generally has a command system peculiar to a used page description language. Accordingly, the print mail receiving utility 31 judges what emulation should be used to process the print file in connection with the used page description language.

The printer driver 30 may be provided with the above-mentioned function of judging the attribute of the print file. More specifically, the function of judging the attribute of the print file is provided at the printer driver 30 side together with a plurality of emulations. In this case, the print mail receiving utility 31 informs the printer driver 30 that the received mail contains a print file, instead of selecting a specific emulation and instructing the printer driver 30. The printer driver 30 then selects and starts a suitable emulation. Since the attribute of the print file need not be designated at the addresser's side in either case, time can be saved at the addresser's side.

The print mail receiving utility 31 having started upon power supply to the printer 22 requires as the POP client 36 the electronic mail directed to the POP client 36 of the POP server 38 of the mail servers 24 and 26. At request, the POP server 38 reads data of the electronic mail (mail data) from the mail spool 34 via a Post Office Protocol Ver. 3 (POP 3), transmitting the data to the POP client 36 side. The POP client 36 writes the received mail data onto a mail buffer 40 provided on the RAM. The print mail receiving utility 31 controls via the printer driver 30 the printing section 29 according to the contents of the mail data written onto the mail buffer 40 in the manner as will be described later, so that the electronic mail is printed on printing paper.

The print mail receiving utility (hereinafter, "utility") 31 executed by the control section 10 of the printer 22 will be described with reference to FIG. 3. Upon start of the processing, the utility 31 executes step S1 to access the POP server 38 in the mail server 26 to inquire about presence or absence of an electronic mail. When the electronic mail stored in the mail spool 34 includes that directed to the printer 22, the POP server 38 delivers to the control section 10 information that the electronic mail is present. The utility 31 advances to step S3 when the electronic mail is present. The utility 31 is on standby when no electronic mail is present. The process at step S1 need not be ordinarily repeated and may be suitably timed by means of timer interrupt. Accordingly, the control section 10 can execute another process regarding the printer 22 while the utility 31 is on standby at step S1.

When the electronic mail is present in the mail server 26 (YES at step S1), the utility 31 advances to step S3 to read out the electronic mail from the mail server 26. Then, the utility 31 advances to step S5 to analyze an identifier in the mail head to thereby judge whether the electronic mail is accompanied by a print file the printer driver 30 can process for the printing. When the electronic mail is accompanied by such a print file (YES at step S5), the utility 31 advances to step S7 to extract or read out the print file. Thereafter, based on the print file, the utility 31 advances to step S9 to instruct the printer driver 30 to print the mail data as a normal print data. The utility 31 then advances to step S1. As a result, the mail data can be printed in a suitable form according to the print file when the electronic mail is accompanied by the print file.

On the other hand, when the electronic mail is accompanied by no print file (NO at step S5), the utility 31 advances to step S15 to analyze the mail header to thereby judge whether the electronic mail is accompanied by any accompanying file other than the print file. When the electronic mail is not accompanied by any accompanying file (NO at step S15), the utility 31 advances to step S17 to convert the electronic mail to text document and then advances to step S19. At step S19, the utility 31 instructs the printer device 30 to carry out code conversion of the electronic mail to the text document and the printing. The utility 31 then advances to step S1.

Further, when the electronic mail is accompanied by an accompanying file other than the print file (YES at step S15), the utility 31 advances to step S25 to judge whether the accompanying file is processable. In the embodiment, when the accompanying file is an image file in the form of TIFF or JPEG, for example, the utility 31 judges that the file is processible. Regarding these forms of image files, a format for image formation can easily be defined by the use of internal facsimile mode if the printer 22 is provided with a large number of emulations. The utility 31 judges in the affirmative at step S25 when the electronic mail is accompanied by the accompanying file in one of these forms, then advancing to step S27.

The utility 31 extracts the accompanying file at step S27, then advancing to step S29. The utility 31 selects a predetermined font and print form according to the accompanying file at step S29. The utility 31 further instructs the printer driver 30 to convert the mail data to data suitable for the accompanying file and to print the mail data. The utility 31 then advances to step S1. As a result, printing can be carried out in the suitable form according to the accompanying file when the electronic mail is accompanied by the above-described image file.

Further, when the accompanying file cannot be processed (N at step S25), the utility 31 advances to step S31 to display an error message on a display panel (not shown) and then to erase the mail data in the mail buffer 40 (step S33). The utility 31 then advances to step S1.

The mail data can be processed by any other software even when cannot be processed by the printer 22. In view of this, such a mail data may be maintained in the mail buffer 40 until the utility 31 receives a specific instruction. In this case, that the electronic mail has been processed once is desired to be stored in order that the utility 31 may be prevented from reading out the same electronic mail at many times at steps S1 and S2.

According to the above-described printer 22, when the electronic mail is accompanied by the print file (YES at step S5), the printing can be carried out in a suitable form according to the print file. When the electronic mail is accompanied by an image file etc. (YES at step S25), the printing can be carried out in the form suitable according to the accompanying file. Consequently, an image exceedingly approximated to the one the addresser has intended can be printed on printing paper. Further, when the electronic mail is accompanied by no accompanying file (No at step S15), the electronic mail can be printed as the text document (steps S17 and S19). Moreover, the above-described printing can be carried out with the printer 22 being directly connected to the internet 28 without via a personal computer. Consequently, the personal computer can be released from the processing of the electronic mail and accordingly, can be used further efficiently.

In the foregoing embodiment, the process at step S5 constitutes a first judging process in the invention. The processes at step S7 and S9 constitute a first formation control process. The process at step S15 constitutes a second judging process. The processes at steps S17 and S19 constitute a second formation control process. The process at step S25 constitutes a third judging process. The processes at steps S27 and S29 constitute a third formation control process.

The CPU of the control section 10 executing the above-described processes and a storage area of the ROM of the control section 10 storing the programs of the processes constitute first judging means (a first judging circuit), first formation control means (a first formation control circuit), second judging means (a second judging circuit), second formation control means (a second formation control circuit), third judging means (a third judging circuit), and third formation control means (a third formation control circuit) in the invention. The mail buffer 40 of the control section 10 constitutes electronic mail receiving means (an electronic mail receiving circuit).

Modified forms of the foregoing embodiment will now be described. For example, the storage medium may be an element such as a ROM or a RAM, a CD-ROM, a floppy disc, a photo-magnetic disc, a hard disc, or a file server on the intenet. Further, the storage medium in the invention may be used in a case where image data is read by an image output control device (provided with neither image forming means nor image forming section) such as a print server delivering image data to a printer etc. or a personal computer.

The POP server 38 may periodically access the mail spool 34 even when the POP client 36 inquires the POP server 38 about presence or absence of the electronic mail. In this case, the electronic mail directed to the printer 22 is transferred to the mail box of the POP server 38. Upon inquiry by the POP client 36, the electronic mail stored in the mail box may be transmitted in a batch. The mail spool 34 may be provided for every client independently.

A hard disc may be incorporated in the control section 10 side of the printer 22, so that the mail data transferred from the mail server 26 is disposed at a predetermined directly of the hard disc.

When the utility 31 judges in the negative, a step for judging whether another accompanying file is present, as the step S15. A case where a plurality of accompanying files are present may be coped with. When any one of the accompanying files includes a processible accompanying file, the same processes as those at steps S27 and S29 may be executed for the printing.

Figure 3:
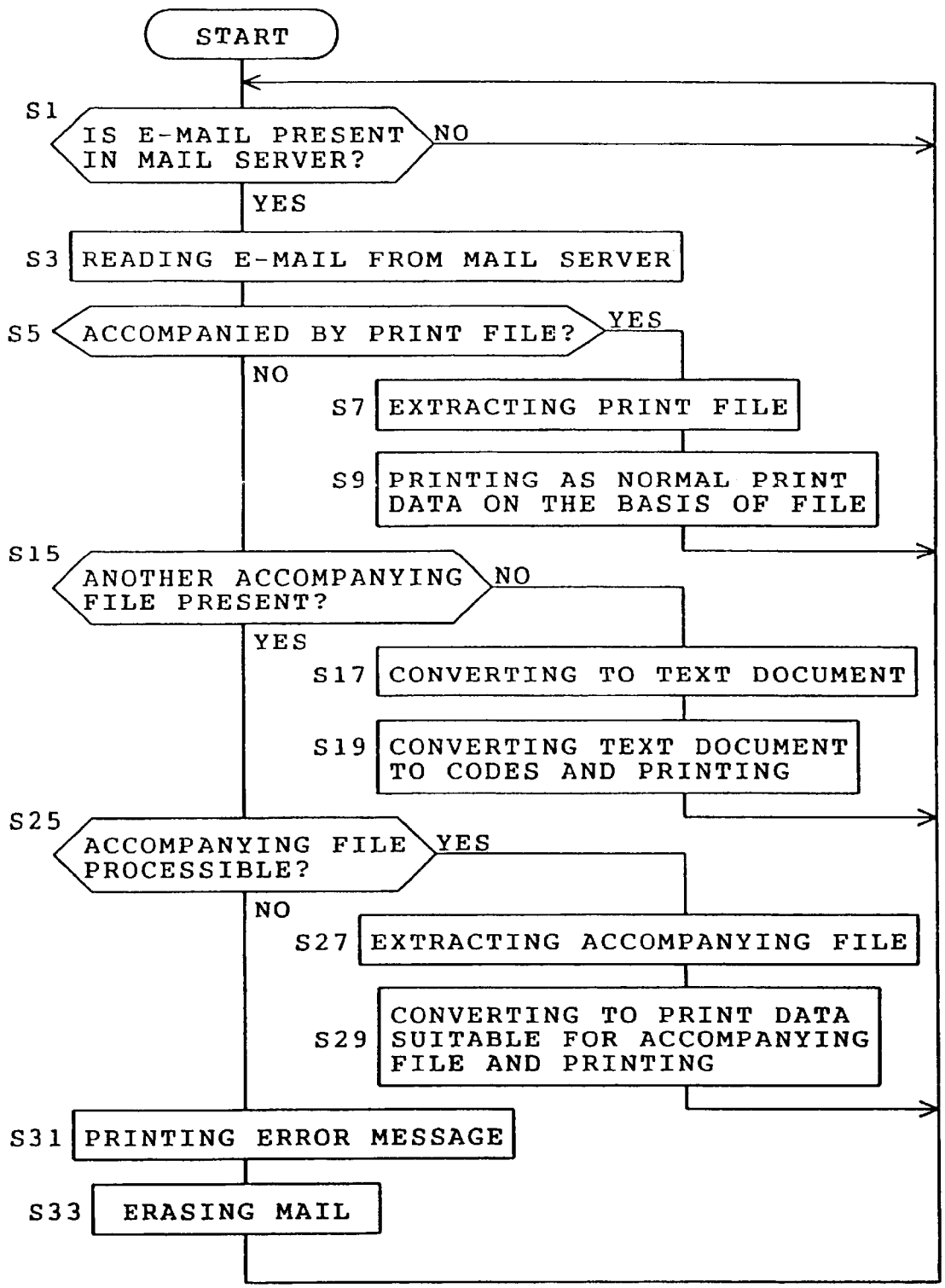
FIG. 3 is a flowchart showing processes a print electronic mail receiving utility.

The contents of the flowchart executed by the utility 31 as shown in FIG. 3 may be constituted by ASIC in which the contents are replaced by logic circuits, so that the judging processes and the formation control processes can be realized as judgment processing circuit and formation control processing circuit.

The foregoing description and drawings are merely illustrative of the principles of the present invention and are not to be construed in a limiting sense. Various changes and modifications will become apparent to those of ordinary skill in the art. All such changes and modifications are seen to fall within the scope of the present invention as defined by the appended claims.

I claim:

1. A storage medium used with equipment receiving an electronic mail transmitted from a computer and controlling so that an image according to contents of the received electronic mail is formed on a recording medium, the storage medium storing a computer program on which the equipment executes the following processes of:
   a judgment for judging whether the electronic mail received by the electronic mail receiving means is accompanied by a print file;
   a first image formation control for forming the image corresponding to the electronic mail in a form based on a print file when the judgment process judges that the electronic mail is accompanied by the print file;
   a second image formation control for forming the image corresponding to the electronic mail in a previously set form when the judgment process judges that the electronic mail is not accompanied by a print file.

2. A storage medium according to claim 1, wherein the computer program executes the processes of:
   a second judgment for judging whether the received electronic mail is accompanied by any accompanying file other than the print file when the judgment process judges that the received electronic mail is not accompanied by the print file;
   a third judgment for judging whether the accompanying file is usable for image formation when the second judgment process judges that the received electronic mail is accompanied by the accompanying file; and
   a third image formation control for forming the image corresponding to the electronic mail in a form based on the accompanying file when the third judgment process judges that the accompanying file is usable for image formation.

3. A storage medium according to claim 2, wherein the third judgment process has a function of judging that the accompanying file is usable for image formation when the accompanying file other than the print file is an image file.

4. A storage medium according to claim 2, wherein the third judgment process has a function of judging whether each of a plurality of accompanying files is usable for image formation when the second judgment process judges that the received electronic mail is accompanied by the plurality of accompanying files other than the print file.

5. A printing apparatus comprising:
   image forming means for forming an image on a recording medium;
   electronic mail receiving means for receiving an electronic mail; and
   control means for controlling the image forming means according to contents of the received electronic mail whether or not the electronic mail is accompanied by a print file, so that an image corresponding to the electronic mail is formed on the recording medium, the control means including:

judging means for judging whether the electronic mail received by the electronic mail receiving means is accompanied by a print file;

first image formation control means for forming the image corresponding to the electronic mail in a form based on a print file when the judging means judges that the electronic mail is accompanied by the print file; and second image formation control means for forming the image corresponding to the electronic mail in a previously set form when the judging means judges that the electronic mail is not accompanied by a print file.

6. The printing apparatus according to claim 5, wherein the control means further includes:

second judging means for judging whether the received electronic mail is accompanied by any accompanying file other than the print file when the judging means judges that the received electronic mail is not accompanied by the print file;

third judging means for judging whether the accompanying file is usable for image formation when the second judging means judges that the received electronic mail is accompanied by the accompanying file; and third image formation control means for forming the image corresponding to the electronic mail in a form based on the accompanying file when the third judging circuit judges that the accompanying file is usable for image formation.

7. The printing apparatus according to claim 6, wherein when the accompanying file other than the print file is an image file, the third judging means judges that the accompanying file is usable for image formation.

8. The printing apparatus according to claim 6, wherein when the second judging means judges that the received electronic mail is accompanied by a plurality of accompanying files other than the print file, the third judging means judges whether each of the plurality of accompanying files is usable for image formation.

9. A printing apparatus comprising:

an image forming section for forming an image on a recording medium;

an electronic mail receiving circuit for receiving an electronic mail; and a control circuit for controlling the image forming section according to contents of the received electronic mail whether or not the electronic mail is accompanied by a print file, so that an image corresponding to the electronic mail is formed on the recording medium, the control circuit including:

a judging circuit for judging whether the electronic mail received by the electronic mail receiving circuit is accompanied by a print file;

a first image formation control circuit for forming the image corresponding to the electronic mail in a form based on a print file when the judging circuit judges that the electronic mail is accompanied by the print file; and a second image formation control circuit for forming the image corresponding to the electronic mail in a previously set form when the judging circuit judges that the electronic mail is not accompanied by a print file.

10. The printing apparatus according to claim 9, wherein the control circuit further includes:

a second judging circuit for judging whether the received electronic mail is accompanied by any accompanying file other than the print file when the judging circuit judges that the received electronic mail is not accompanied by the print file;

a third judging circuit for judging whether the accompanying file is usable for image formation when the second judging circuit judges that the received electronic mail is accompanied by the accompanying file; and a third image formation control circuit for forming the image corresponding to the electronic mail in a form based on the accompanying file when the third judging circuit judges that the accompanying file is usable for image formation.

11. The printing apparatus according to claim 10, wherein when the accompanying file other than the print file is an image file, the third judging circuit judges that the accompanying file is usable for image formation.

12. The printing apparatus according to claim 10, wherein when the second judging circuit judges that the received electronic mail is accompanied by a plurality of accompanying files other than the print file, the third judging circuit judges whether each of the plurality of accompanying files is usable for image formation.

13. An image output control device controlling a printing apparatus for forming an image on a recording medium, comprising:

electronic mail receiving means for receiving an electronic mail; and control means for controlling the printing apparatus according to contents of the received electronic mail whether or not the electronic mail is accompanied by a print file, so that an image corresponding to the electronic mail is formed on the recording medium, the control means including:

judging means for judging whether the electronic mail received by the electronic mail receiving means is accompanied by a print file;

first image formation control means for forming the image corresponding to the electronic mail is a form based on a print file when the judging means judges that the electronic mail is accompanied by the print file; and second image formation control means for forming the image corresponding to the electronic mail in a previously set form when the judging means judges that the electronic mail is not accompanied by a print file.

14. Am image output control device according to claim 13, wherein the control means further includes:

second judging means for judging whether the received electronic mail is accompanied by any accompanying file other than the print file when the judging means judges that the received electronic mail is not accompanied by the print file;

third judging means for judging whether the accompanying file is usable for image formation when the second judging means judges that the received electronic mail is accompanied by the accompanying file; and third image formation control means for forming the image corresponding to the electronic mail in a form based on the accompanying file when the third judging means judges that the accompanying file is usable for image formation.

15. An image output control device according to claim 14, wherein when the accompanying file other than the print file is an image file, the third judging means judges that the accompanying file is usable for image formation.

16. An image output control device according to claim 14, wherein when the second judging means judges that the received electronic mail is accompanied by a plurality of accompanying files other than the print file, the third judging means judges whether each of the plurality of accompanying files is usable for image formation.

* * * * *